United States Patent [19]

Hanma et al.

[11] 4,237,476
[45] Dec. 2, 1980

[54] AUTOMATIC TILT CONTROL CIRCUIT FOR TELEVISION RECEIVERS

[75] Inventors: Kentaro Hanma, Yokohama, Japan; Takeshi Murakami, Ridgewood, N.J.

[73] Assignee: Hitachi, Ltd., Japan

[21] Appl. No.: 31,304

[22] Filed: Apr. 18, 1979

[30] Foreign Application Priority Data

Apr. 20, 1978 [JP] Japan .................................. 53/47549

[51] Int. Cl.³ .......................................... H04N 9/537
[52] U.S. Cl. .................................................... 358/38
[58] Field of Search ................... 358/21 R, 27, 35, 38, 358/39, 40

[56] References Cited

U.S. PATENT DOCUMENTS

| 3,079,461 | 2/1963 | Keizer ..................................... 358/38 |
| 3,582,540 | 6/1971 | Adler ...................................... 358/38 |
| 3,749,824 | 7/1973 | Sagishima .............................. 358/38 |

Primary Examiner—Robert L. Griffin
Assistant Examiner—Michael A. Masinick
Attorney, Agent, or Firm—Craig & Antonelli

[57] ABSTRACT

A television receiver provided with a circuit automatic tilt control circuit which can automatically correct the frequency response characteristic of the television signal. The television receiver comprises an SAW filter having one input electrode set and two output electrode sets, and a frequency response controlling circuit in which intermediate frequency signals delivered from the two output electrode sets of the SAW filter are added together and the amplitude of a summed intermediate frequency signal is varied. The frequency response of the frequency response controlling circuit is controlled by detecting the amplitude of the color burst signal such that the amplitude of the color burst signal is constantly invariable. In the event that amplitudes of the picture signal high frequency component and the chrominance subcarrier become excessive or insufficient, the amplitudes are corrected to correct values to ensure that high quality pictures can constantly be displayed on the screen of the television receiver.

5 Claims, 8 Drawing Figures

AUTOMATIC TILT CONTROL CIRCUIT FOR TELEVISION RECEIVERS

BACKGROUND OF THE INVENTION

1. FIELD OF THE INVENTION

This invention relates to a circuit for correcting frequency response characteristics of the television signal and more particularly to a circuit which automatically controls band characteristics (frequency response characteristics) of the video intermediate frequency circuit so as to constantly keep the amplitude of a high frequency component of the picture signal correct, thereby making it possible to constantly display high quality pictures on the screen of the picture tube.

2. DESCRIPTION OF THE PRIOR ART

In color television receivers, in the event that the antenna is mismatched with the tuner or the tuner is erroneously tuned, the frequency response is degraded in the circuit ranging from the antenna to the tuner with the result that the amplitude of the picture signal or chrominance subcarrier contained in the received television signal becomes either excessive or insufficient. An insufficient amplitude of the picture signal, for example, is responsible for insufficient contrast and brightness. To cope with this problem, a typical television receiver is provided with an AGC (Automatic Gain Control) circuit which is adapted to keep the amplitude of the picture signal correct so that contrast and brightness are correctly maintained. Usually, the AGC circuit detects the amplitude of the horizontal synchronizing signal contained in the television signal and then controls the gains of the tuner and the intermediate frequency circuit in such a manner that the detected amplitude is kept invariable, thereby keeping the amplitude of the picture signal correct. However, since the AGC circuit is designed for control for keeping the amplitude of the relatively low frequency horizontal synchronizing signal constant, the amplitude of the low frequency component contained in the picture signal can be kept correct by the AGC circuit. However, the amplitude of high frequency component of the picture signal can not be kept correct by this approach.

An excessive or insufficient amplitude of the chrominance subcarrier, on the other hand, leads to an excessive or insufficient color saturation. A solution to this problem is the provision of an ACC (Automatic Color Control) circuit as disclosed in the U.S. Pat. No. 3,079,461 to E. O. Keizer, which ACC circuit detects the amplitude of color burst signal contained in the chrominance subcarrier and then performs an automatic control for keeping the detected color burst signal amplitude invariable to thereby keep the amplitude of the chrominance subcarrier correct.

As described above, the ordinary television receiver is incorporated with circuits for keeping correct amplitudes for the picture signal low frequency component and the chrominance subcarrier, respectively, whereas it usually lacks a circuit for keeping the amplitude of the high frequency component of the picture signal correct. Thus, in the event that the amplitude of the high frequency component of the picture signal is decreased owing to mismatching or erroneous tuning of the tuner, resolution of the picture to be displayed is decreased. Conversely, with an increased amplitude of the high frequency component, excessive overshooting or undershooting results. In addition, an excessive amplitude of the chrominance subcarrier is responsible for the generation of cross color and interference between the aural carrier and chrominance subcarrier which leads to beat frequencies, thus causing a beat pattern in fringes in the picture.

Needless to say, if the television receiver experienced complete assembling and adjustment, the aforementioned phenomena might not occur. Ideally complete adjustment, however, is rarely the case, and many television receivers go through insufficient adjustments before they are put in operation. Therefore, changes in the amplitudes of the picture signal high frequency component and the chrominance subcarrier is quite possible due to mismatching and erroneous tuning or mistuning.

SUMMARY OF THE INVENTION

It is a prime object of this invention to provide a television receiver which can correct distortion of the amplitude of the picture signal high frequency component resulting from mismatching of the antenna with the tuner and mistuning of the tuner.

In the television receiver according to this invention, amplitude distortion of the chrominance subcarrier is detected to presume an amplitude distortion of the picture signal high frequency component. The video intermediate frequency circuit incorporates an SAW (Surface Acoustic Wave) filter which causes the band characteristic of the video intermediate frequency circuit to vary in accordance with amplitude distortion of the chrominance subcarrier to thereby correct amplitude distortion of the picture signal high frequency component. More particularly, when the amplitude of the picture signal high frequency component is excessively large, the frequency response of the intermediate frequency circuit is varied to decrease the amplitude. On the other hand, when the amplitude is insufficient, the frequency response is varied to increase the amplitude. This invention, however, does not contemplate direct detection of amplitude distortion of the picture signal high frequency component. Instead, it relies on detection of the amplitude of the color burst signal to presume an amplitude distortion of the picture signal high frequency component. The frequency of the color burst signal is 3.58 MHz and approximates the frequency of the picture signal high frequency component. Generally, since the amplitude of picture signal high frequency component increases owing to mismatching or mistuning, the amplitude of the color burst signal also increases. Similarly, as the high frequency component amplitude decreases, the color burst signal amplitude also decreases. Accordingly, it is possible to presume amplitude distortion of the picture signal high frequency component by detecting the amplitude of the color burst signal.

DESCRIPTION OF THE PREFERRED EMBODIMENTS

Figure 1:
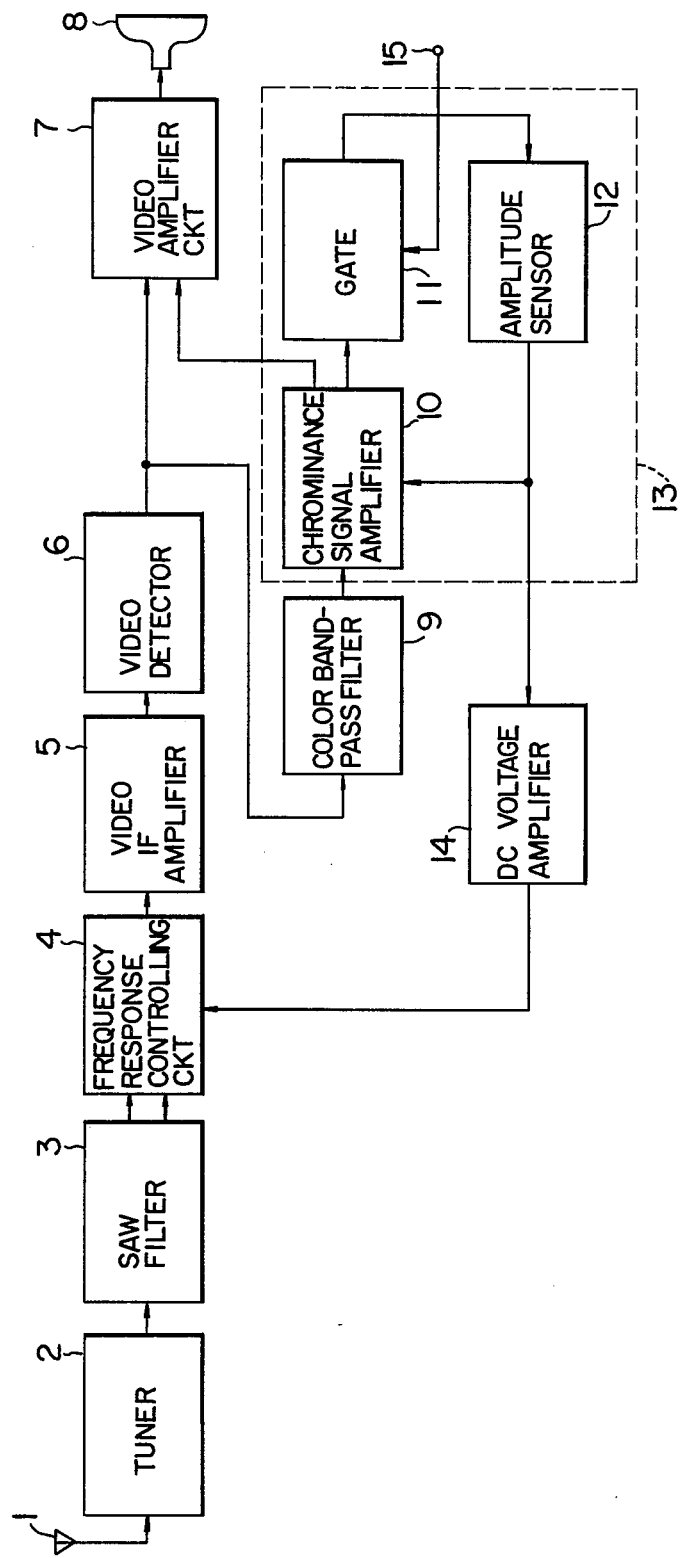
FIG. 1 is a block diagram of a first embodiment of the television receiver in accordance with this invention.

In the following description of this invention made with reference to the accompanying drawings, a first embodiment of this invention, shown in block form in FIG. 1 comprises an antenna 1 for picking up a television signal which is converted at a tuner 2 into an intermediate frequency signal (IF signal). The IF signal is fed via an SAW (Surface Acoustic Wave) filter 3 and a frequency response controlling circuit 4 to a video intermediate frequency amplifier circuit 5, and the amplified output therefrom is detected at a video detector circuit 6. The SAW filter 3 and the frequency response controlling circuit 4 form part of this invention and will be detailed later. The television signal detected at the video detector circuit 6 is fed to a video amplifier circuit 7 and to a color bandpass filter 9. At the color bandpass filter 9, a chrominance subcarrier is filtered out of the television signal and is then fed to a chrominance signal amplifier circuit 10 in which the chrominance subcarrier is amplified and demodulated to be fed to the video amplifier circuit 7. This video amplifier circuit 7 thus receives a picture signal contained in the television signal from the video detector circuit 6 and the chrominance subcarrier from the chrominance signal amplifier circuit 10 to synthesize and convert these signals into three video signals of red, green and blue colors. These signals are, in turn, used to reproduce a color picture on the screen of a picture tube.

The chrominance subcarrier amplified in the chrominance signal amplifier circuit 10 is also transmitted to a gate circuit 11. The horizontal synchronizing signal from, for example, a synchronizing separation circuit (not shown) of the television receiver is fed to the gate circuit 11 via a terminal 15. When the gate circuit 11 is opened by the horizontal synchronizing signal, the color burst signal is derived out of the chrominance subcarrier and applied to an amplitude sensor circuit 12. The amplitude sensor circuit 12 generates a DC voltage whose level depends on the amplitude of the color burst signal, and this DC voltage is fed to the chrominance signal amplifier circuit 10 to vary its gain. The chrominance signal amplifier circuit 10, gate circuit 11 and amplitude sensor circuit 12 constitute an ACC circuit 13. Thus, for an excessively large amplitude of the color burst signal, the gain of the chrominance signal amplifier circuit 10 is decreased, and for an insufficient amplitude of the color burst signal, the chrominance signal amplifier circuit 10 is increased in gain so that the amplitude of the chrominance subcarrier can constantly be kept at the correct level. The DC voltage generated at the amplitude sensor circuit 12 is also transmitted to a DC voltage amplifier circuit 14 and an amplified output therefrom is fed to the frequency response controlling circuit 4.

The antenna 1, tuner 2, video intermediate frequency amplifier circuit 5, video detector circuit 6, video amplifier circuit 7, color bandpass filter 9 and ACC circuit 13 shown in FIG. 1 are identical with those of the ordinary television receiver and are not detailed herein. The provision of an AGC circuit, a synchronizing circuit, a deflection circuit and an aural circuit is usual in the ordinary television receiver and no description is given of these circuits.

When the frequency response characteristic of the television signal is degraded by mismatching of the antenna 1 with the tuner 2 and mistuning of the tuner 2, amplitudes of the picture signal and the chrominance subcarrier will vary. However, as described above, the amplitude of the chrominance subcarrier is corrected through the ACC circuit 13. Accordingly, the DC voltage level generated by the amplitude sensor circuit 12 included in the ACC circuit 13 is a signal for correcting amplitude distortion of the chrominance subcarrier and is also a signal for indicating the degree of degradation in the frequency response characteristic of the television signal. Therefore, if the frequency response characteristic of the television signal can desirably be varied with the DC voltage generated by the amplitude sensor circuit 12, it will be possible to correct any distortion in the frequency response characteristic of the picture signal. This invention makes use of the SAW filter 3 and the frequency response controlling circuit 4 to correct the frequency response characteristic of the picture signal.

Figure 2:
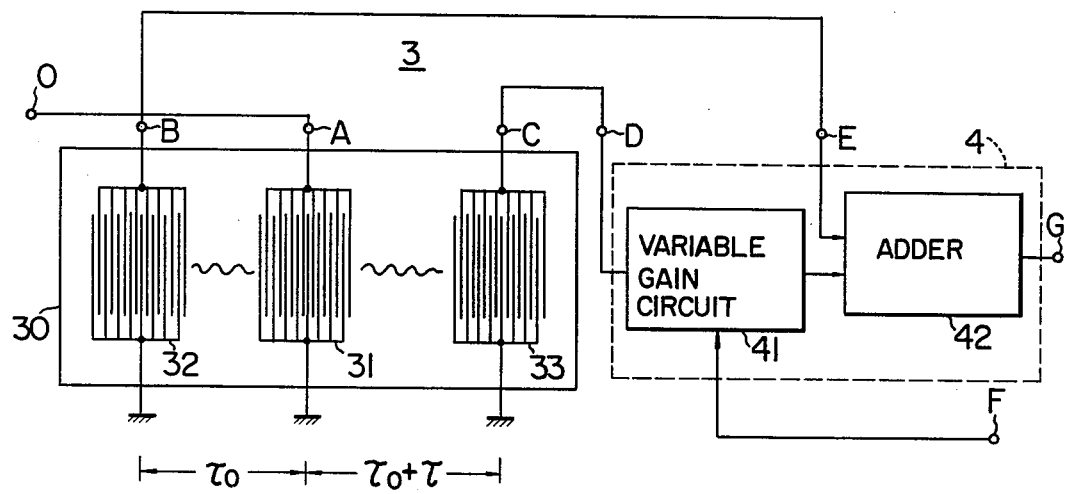
FIG. 2 is a block diagram of an SAW filter and a frequency response controlling circuit used in this invention.

The connection of the SAW filter 3 to the frequency response controlling circuit 4 is illustrated in FIG. 2 in block form. The SAW filter 3 comprises a base plate 30 constituting an elastic surface wave or surface acoustic wave element, an input electrode plate set 31, and a pair of output electrode plate sets 32 and 33. The lefthand and righthand output electrode sets 32 and 33 are spaced apart from the central input electrode set 31 by suitable distances.

Each of the electrode sets 31, 32 and 33 is of an interdigital type. When the input signal is applied to the input electrode set 31 via a terminal A, surface waves of the same energy propagate toward the lefthand output electrode set 32 and the righthand output electrode set 33, generating a signal at the output electrode set 32 at a delay time $\tau_0$ and a signal at the output electrode set 33 at a delay time $\tau_0 + \tau$. In other words, delivery of the signal applied to terminal A from a terminal B is delayed by $\tau_0$ and the delivery from a terminal C is delayed by $\tau_0 + \tau$. The delay times depend on distances of the output electrode sets from the input electrode set. The signal appearing at the terminal C is applied to one input of an adder circuit 42 via an input terminal D of the frequency response controlling circuit 4 and a variable gain circuit 41 while the signal appearing at the terminal B is applied to the outer input of the adder circuit 42 via an input terminal E of the circuit 4, thus producing a summation signal from an output terminal G. With this construction, when a controlling signal is applied to the control input of the variable gain circuit 41 to cause the gain of the circuit 41 to vary, the frequency response characteristic of the transmission system ranging from input terminal A to output terminal G can be controlled. This operation will be described in more detail. Assume now that the surface wave can propagate along the surface of the base plate 30 without loss and that the conversion of an electrical signal into a surface wave at the electrode sets 31, 32 and 33 does not undergo variations in frequency characteristic which exceed the band width of the television signal. Then, when an input signal $E_1$ as represented by, is applied to the input terminal A, a signal $E_2$ of a voltage which is, $$E_2 = \tfrac{1}{2} e^{j\omega(t-\tau_0)} \tag{2}$$

is obtained from the output terminal B and a voltage signal $E_3$ which is, $$E_3 = \tfrac{1}{2} e^{j\omega(t-\tau_0-\tau)} \tag{3}$$

is obtained from the output terminal C, where t represents time and $\omega$ circular frequency.

Where the variable gain circuit 41 has a gain of $-A$ to thereby produce an output signal of $-AE_3$, the adder circuit 42 adding the signals $3_2$ and $-AE_3$ produces at its output terminal G a signal $E_4$ which is, $$\begin{aligned} E_4 &= E_2 - AE_3 \\ &= \tfrac{1}{2} e^{j\omega(t-\tau_0)} \sqrt{1 - 2A\cos\omega\tau + A^2} \end{aligned} \tag{4}$$

Thus, the signal $E_4$ relative to the input signal $E_1$ has an absolute value $|F(j\omega)|$ written by, $$|F(j\omega)| = \tfrac{1}{2} \sqrt{1 + A^2 - 2A\cos\omega\tau} \tag{5}$$

Figure 3:
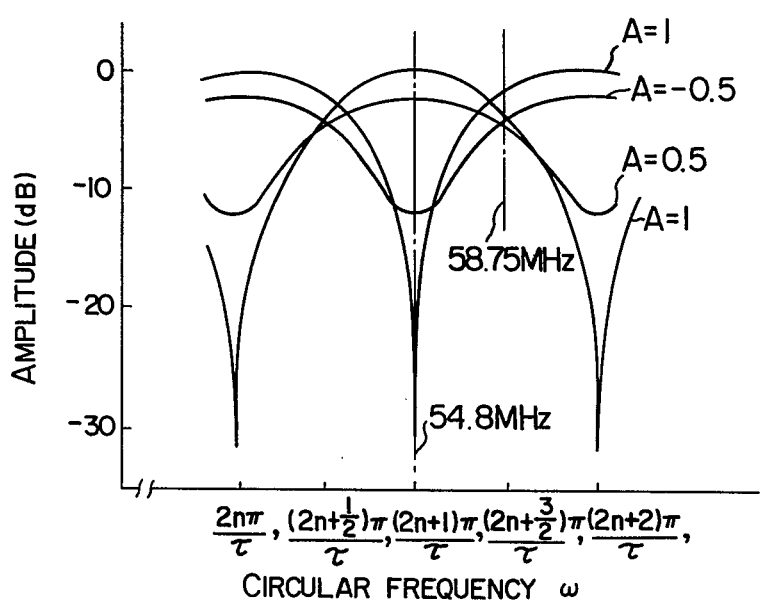
FIG. 3 is a graph showing the basic frequency response characteristics of the SAW filter and a frequency response controlling circuit.

As will be seen from equation (5), so-called comb-shape filter characteristics which periodically vary with circular frequency $\omega$ as graphically shown in FIG. 3 can be obtained for various values of the circular frequency $\omega$ together with the parameter of gain varying from $-1$ to 1. In FIG. 3, abscissa represents the circular frequency and ordinate the amplitude. When delay time $\tau$ is adjusted by determining the distances of the output electrode sets 32 and 33 from the input electrode set 31 in the SAW filter 3 such that a value of circular frequency $(2n+3/2)\pi/\tau = \omega_p$ approximates a frequency $f_p$ of the video carrier in the video intermediate frequency signal, that is, $f_p \approx \omega_p/2\pi$ and such that a value of circular frequency $(2n+1)\pi/\tau = \omega_c$ approximates a frequency $f_c$ of the chrominance subcarrier, that is, $f_c \approx \omega_c/2\pi$, the amplitude varies slightly around the frequency $f_p$ of the video carrier even when gain A of the variable gain circuit 41 varies but the variation in amplitude is maximized around the frequency $f_c$ of the chrominance subcarrier. For example, where the frequency $f_p$ of the video carrier is 58.75 MHz and delay time $\tau$ is about 63.8 nS for $n=3$, the variation in amplitude is maximized at about 54.8 MHz as the gain A varies.

Figure 4:
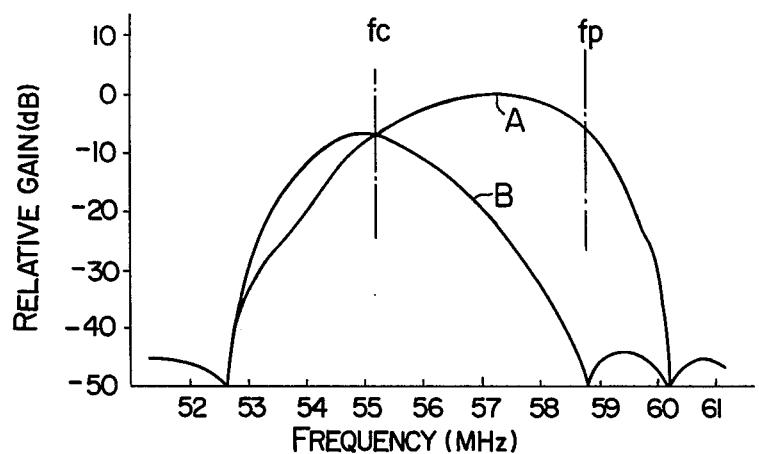
FIG. 4 is a graph showing frequency response characteristics of the SAW filter.

In the foregoing description, it was assumed that the conversion of an electrical signal into a surface wave or vice-versa at the electrode sets 31, 32 and 33 did not undergo variations in frequency response characteristic. However, as is well known in the art, the frequency response characteristic varies depending on configurations of the electrode sets 31, 32 and 33 in the SAW filter. Conversely, it is possible to provide the desired frequency response characteristics by selecting the configuration of electrode sets 31, 32 and 33. In FIG. 4, curve A, representative of the frequency response between input electrode set 31 and output electrode set 32, and curve B, representative of the frequency response between input electrode 31 and output electrode set 33 are determined so as to form part of this invention, where the abscissa represents the frequency and the ordinate represents the relative gain. Particularly, the frequency response characteristic between electrode sets 31 and 32 represented by curve A is selected to be the same as that of the IF circuit of the ordinary television receiver and the frequency response characteristic between electrode sets 31 and 33 is such that the maximum gain occurs around the frequency $f_c$ of the chrominance subcarrier and the minimum gain occurs around the frequency $f_p$ of the video carrier. Equation (5) holds of course in these frequency response characteristics.

Figure 5:
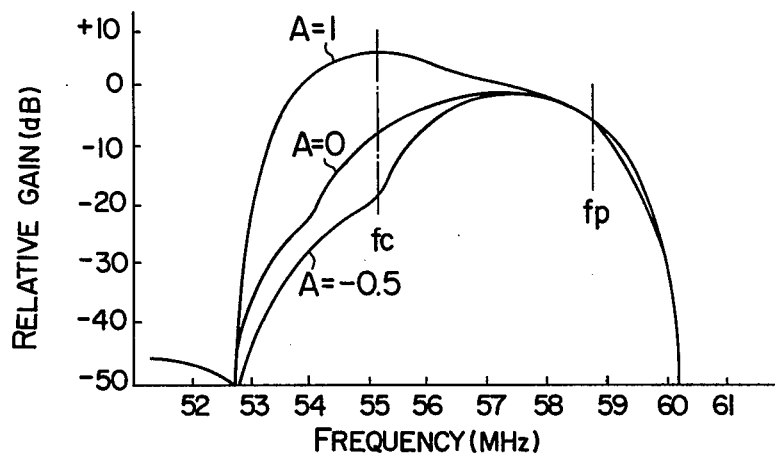
FIG. 5 is a graph showing frequency response characteristics of the SAW filter and a frequency response controlling circuit in accordance with this invention.

Accordingly, where the frequency response between an input electrode set 31 and an output electrode set 33 is determined by curve A in Fig. 4, the frequency response between the input electrode set 31 and the output electrode set 33 is determined by curve B in FIG. 4, and gain A of the variable gain circuit 41 included in the frequency response controlling circuit 4 varies, for example, between $A = -0.5$ and $A = 1$, the SAW filter 3 and frequency response controlling circuit 4 has the frequency response characteristics as shown in FIG. 5 wherein for $A = -0.5$. Also, the relative gain decreases around the frequency $f_c$ of the chrominance subcarrier. For $A = 0$, the frequency response is the same as that of the ordinary IF circuit. For $A = 1.0$, the relative gain increases around the frequency $f_c$ of the chrominance subcarrier. The relative gain remains of course substantially unchanged around the frequency $f_p$ of the video carrier.

Consequently, when use is made to the SAW filter 3 and the frequency response controlling circuit 4 having the above frequency response and gain A of the variable gain circuit 41 is varied, it is possible to vary amplitudes of the chrominance subcarrier and the high frequency component of picture signal. It will be appreciated that the relative gain around the frequency $f_p$ of the video carrier remains unchanged even when the gain A of the frequency response controlling circuit 4 varies so that the amplitude of low frequency component of the picture signal will not change.

It should be understood that in the foregoing the invention was described by way of the television signal available in Japan but is effectively applicable to the television signal available in the United States by suitably determining the delay time $\tau$.

Figure 6:
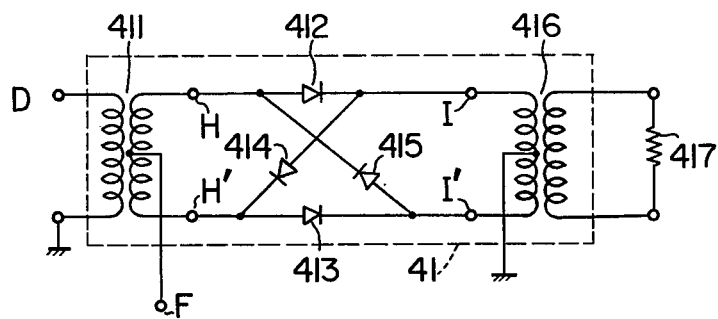
FIG. 6 is a circuit diagram of a variable gain circuit used in the frequency response controlling circuit.

Turning to FIG. 6, there is shown one example of the variable gain circuit 41. In the circuit diagram of FIG. 6, high frequency transformers 411 and 416 each having one winding connected with a center tap, diodes 412 to 415 are connected in a bridge fashion, and a control signal is applied across center taps of the transformers 411 and 416 via a terminal F.

When applying the control signal of a proper, positive value to the terminal F, the diodes 412 and 413 are turned on and forward currents flow therethrough via terminals H and H' of the secondary winding of the transformer 411, returning to ground via terminals I and I' of the primary winding of the transformer 416. At this time, the diodes 414 and 415 are reverse biased.

Consequently, a signal applied to an input terminal D is transmitted to the transformer 416 via transformer 411 and diodes 412 and 413, providing the variable gain circuit 41 with a gain A of 1 (unity). The signal thus transmitted to the transformer 416 is then transferred to a load 417. To this end, it is necessary that the level of conduction current flowing through the diodes 412 and 413 be sufficiently larger than that of the signal to be transmitted.

Subsequently, by applying the control signal of a proper, negative voltage to the terminal F, the diodes 414 and 415 are turned on and forward currents flow therethrough from ground via the primary winding of the transformer 416 and terminals I and I'. At the same time, the diodes 412 and 413 are reverse biased. As a result, the terminals H and H' are coupled with the terminals I' and I via diodes 414 and 415 so that the signal at the terminal D is transmitted from the transformer 411 to the transformer 416 in inverting polarity, providing the variable gain circuit 41 with a gain A of −1. Thus, as the control voltage applied to the terminal F is continuously varied from positive to negative, the gain A is continuously varied from 1 to −1. In other words, as the control voltage applied to the terminal F is gradually decreased from the positive value, internal resistances of the diodes 412 and 413 increase and the signal being transmitted to the load 417 is divided by these internal resistances. With the internal resistances of the diodes 412 and 413 increased, the signal being transmitted to the load 417 decreases and hence the gain A of the variable gain circuit becomes less than 1. When the control voltage applied to the terminal F is increased from the negative value, the signal being transmitted to the load 417 is divided by the internal resistances of the diodes 414 and 415.

Since the amplitude of the signal applied to the terminal D is about 50 mV$_{p-p}$, the diodes 412 to 415 will not be reverse biased thereby.

The overall operation of the controlling circuit is as follows.

When the antenna 1 is mismatched with the tuner 2, or the tuner 2 is mistuned, and the picture signal high frequency component and chrominance subcarrier whose amplitudes are insufficient are detected at the video detector circuit 6, the chrominance subcarrier is fed via the color bandpass filter 9 and chrominance signal amplifier 10 to the gate circuit 11 at which the color burst signal is derived from the chrominance subcarrier. The amplitude of the color burst signal is sensed at the amplitude sensor circuit 12. With an insufficient amplitude of the chrominance subcarrier, the amplitude sensor circuit 12 generates a DC voltage which increases the gain of the chrominance signal amplifier circuit 10. With the gain of the chrominance signal amplifier circuit 10 is increased by this DC voltage, the chrominance subcarrier is amplified correspondingly at the chrominance signal amplifier circuit 10 to thereby correct the insufficient amplitude. At the same time, the DC voltage generated by the amplitude sensor circuit 12 is also fed to the frequency response controlling circuit 4 via the DC voltage amplifier circuit 14. In accordance with the DC voltage applied, the frequency response of the frequency response controlling circuit 4 is automatically varied in such a manner that the amplitudes of the picture signal high frequency component and chrominance subcarrier increase. Consequently, the amplitudes of the picture signal high frequency component and chrominance subcarrier are corrected. The picture signal and chrominance subcarrier thus corrected are detected at the video detector circuit 6 and thereafter synthesized at the video amplifier circuit 7, followed by being reproduced at the picture tube 8.

When the amplitudes of the picture signal high frequency component and chrominance subcarrier are excessively large, the amplitude sensor circuit 12 generates the DC voltage which is effective to decrease the gain of the chrominance signal amplifier circuit 10 and this DC voltage causes the frequency response of the frequency response controlling circuit 4 to vary such that the amplitudes of the picture signal high frequency component and chrominance subcarrier are decreased.

Although the chrominance subcarrier is corrected by one closed circuit (hereinafter referred to as an ATC circuit-Automatic Tilt Control circuit) including the frequency response controlling circuit 4, intermediate frequency circuit 5, video detector circuit 6, bandpass filter 9, ACC circuit 13 and DC voltage amplifier circuit 14 and the other closed circuit, corresponding to the ACC circuit 13 including the chrominance signal amplifier circuit 10, gate circuit 11 and amplitude sensor circuit 12, both the closed circuits are compatible if the amplification degree of the DC voltage amplifier circuit 14 is selected to be so large that the loop gain of the ATC circuit is made larger than that of the ACC circuit. Because, in the event that the amplitude of the chrominance subcarrier is excessive or insufficient, the loop gain of the ATC circuit larger than that of the ACC circuit initiates preferential operation of the ATC circuit so that the amplitude of the chrominance subcarrier is first corrected to an approximately correct value. Concurrently therewith, the amplitude of the picture signal high frequency component is of course corrected. This leads to reproduction of a comparatively excellent picture on the screen of the picture tube 8. Subsequently, the ACC circuit is allowed to correct the amplitude of the chrominance subcarrier more precisely than the ATC circuit does, thereby ensuring that the picture tube can reproduce a picture of correct color saturation.

As described above, this invention can correct the amplitude distortion of the picture signal high frequency component due to mismatching of the antenna with the tuner or mistuning of the tuner. Accordingly, pictures being displayed on the picture tube are free from overshooting and undershooting. At the same time, the amplitude distortion of the chrominance subcarrier is corrected to prevent the amplitude of chrominance subcarrier from becoming excessive, whereby not only cross color in the picture but also interference of the chrominance subcarrier with the aural signal at the video detector circuit 6 can be prevented. This prevents the generation of stripe noises in the picture display.

Figure 7:
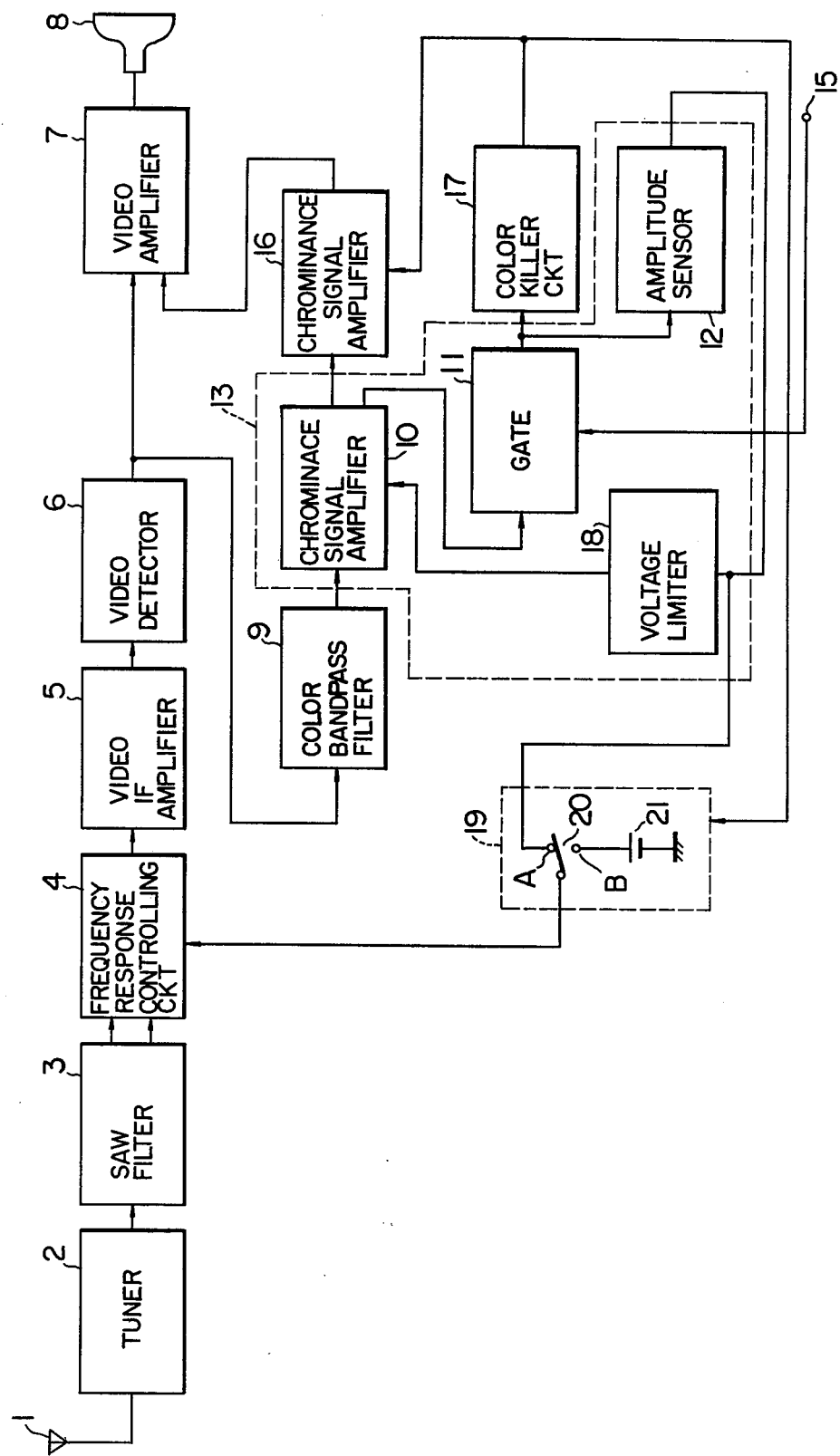
FIG. 7 is a block diagram of a second embodiment of this invention.

Reference is now made to FIG. 7 showing a second embodiment of this invention. This second embodiment is featured by, in the first place, the provision of an erroneous operation preventing switch circuit 19 and by, in the second place, the provision of a voltage limiter circuit 18 included in the ACC circuit 13. Also, this embodiment additionally comprises a second chrominance signal amplifier circuit 16 and a color killer circuit 17. The second chrominance signal amplifier circuit 16 and the color killer circuit 17 are identical with these of the ordinary television receiver. The color killer circuit detects presence or absence of the color burst signal to determine whether the received television signal is the monochrome signal or the chrominance signal, and delivers the output signal which is fed to the second chrominance signal amplifier circuit 16 whose gain is made zero by the color killer output when the television signal is the monochrome signal.

The erroneous operation preventing switch circuit 19 serves to prevent erroneous operation of the ATC circuit when the television signal received at tuner 2 is the monochrome signal. The monochrome television signal lacks the chrominance subcarrier and usually the color burst signal. Accordingly, it is impossible for the amplitude sensor circuit 12 to sense the color burst signal. As a result, irrespective of the presence or absence of the mismatching and mistuning, the ATC circuit recognizes insufficiency of the amplitudes of the picture signal high frequency component and chrominance subcarrier, and operates to increase the amplitude of the picture signal high frequency component, thereby producing excessive overshooting and undershooting in the picture. Obviously, the ATC circuit erroneously recognizes and operates. Therefore, the ATC circuit must be inhibited from operating when the tuner 2 receives the monochrome television signal.

The color killer circuit 17 can recognize whether the television signal is the chrominance signal or the monochrome signal. Based on this, the output signal of the color killer circuit 17 is used to inhibit operation of the ATC circuit when the television signal is the monochrome signal and to permit operation of the ATC circuit when the chrominance signal is present, thus preventing the ATC circuit from operating erroneously.

More particularly, in accordance with the second embodiment, the output signal of the color killer circuit 17 is fed to the erroneous operation prevention switch circuit 19 to switch over a switch 20 therein. The switch 20 is transferred to a terminal A in the presence of the chrominance signal and to a terminal B in the presence of the monochrome signal. With the switch 20 connected to the terminal A, the ATC circuit operates, whereas with the switch 20 connected to the terminal B, the ATC circuit is prevented from operating while a fixed DC voltage is fed from a DC source 21 to the frequency response controlling circuit 4. The voltage of the DC source 21 is set to a value which makes the band characteristic resulting from the SAW filter 3 and frequency response controlling circuit 4 adaptive to the monochrome television signal. The erroneous operation prevention switch circuit 19 may also be constituted by a relay or electronic circuit.

As described above, since the output signal of the color killer circuit 17 is used to inhibit operation of the ATC circuit in cooperation with the erroneous operation prevention switch circuit 19 when the television signal is a monochrome signal, erroneous operation of the ATC circuit can be prevented.

Next, the voltage limiter circuit 18 will be described. The voltage limiter circuit 18 is adapted to inhibit operation of the ACC circuit 13 when the output voltage of the amplitude sensor circuit 12 lies between predetermined first and second voltages, where the second voltage is higher than the first voltage. Thus, the voltage limiter circuit 18 permits operation of the ACC circuit 13 when the output of the amplitude sensor circuit 12 is below the first voltage or is above the second voltage. This voltage limiter circuit 18 ensures compatibility between the ACC circuit 13 and the ATC circuit without using the DC voltage amplifier circuit 14. By virtue of the voltage limiter circuit 18, even when the loop gain of the ACC circuit 13 is larger than that of the ATC circuit, the ATC circuit operates preferentially to correct amplitude distortions of the picture signal high frequency component and the chrominance subcarrier, followed by operation of the ACC circuit 13 for accurately correcting the amplitude distortion of the chrominance subcarrier alone.

In the event that the amplitude of the chrominance subcarrier becomes excessive or insufficient owing to mismatching or mistuning, the amplitude sensor circuit 12 generates the DC voltage which is fed to the frequency response controlling circuit 4 and the voltage limiter circuit 18. When the amplitude distortion of the chrominance subcarrier is not so large that the output voltage of the amplitude sensor circuit 12 lies between the first and second voltages, the voltage limiter circuit 18 inhibits the ACC circuit 13 from operating and, therefore, the ATC circuit alone operates to simultaneously correct the amplitudes of the chrominance subcarrier and the picture signal high frequency component. In this manner, high quality pictures can be reproduced on the picture tube. Briefly, with a small amplitude distortion of the chrominance subcarrier, the ACC circuit will not operate and the ATC circuit alone corrects the amplitudes of the chrominance subcarrier and the picture signal high frequency component.

On the other hand, when the amplitude distortion of the chrominance subcarrier is so large that the correction for this amplitude distortion by means of the ATC circuit is insufficient, and the output voltage of the amplitude sensor circuit 12 is below the first voltage or is above the second voltage, the voltage limiter circuit 18 permits the ACC circuit 13 to operate. Thus, the amplitude of the chrominance subcarrier is corrected by the ACC circuit 13 more accurately.

In this manner, in the event of an excessive or insufficient amplitude of the chrominance subcarrier due to mismatching or mistuning, the ATC circuit first operates to correct the amplitude distortions of the chrominance subcarrier and the picture signal high frequency component. Then, after the correction for the amplitude distortion of the chrominance subcarrier by means of the ATC circuit alone, the ACC circuit 13 operates to correct the distortion of the chrominance subcarrier more accurately.

As described above, by providing the voltage limiter circuit 18 between amplitude sensor circuit 12 and chrominance signal amplifier circuit 10 in the ACC circuit 13, it is possible to correct the amplitude distortion of the picture signal high frequency component even when the loop gain of the ACC circuit 13 is larger than that of the ATC circuit.

Figure 8:
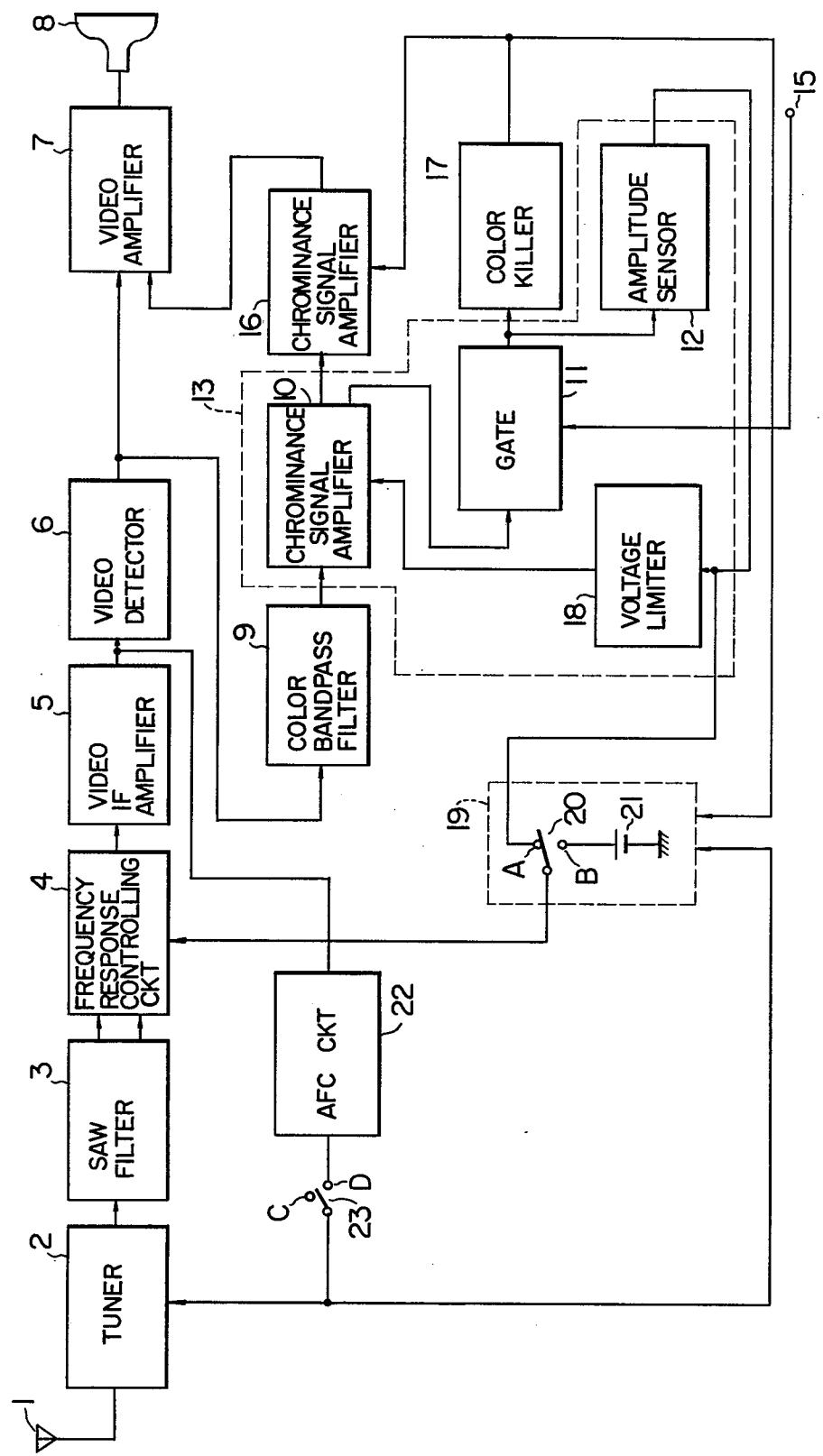
FIG. 8 is a block diagram of a third embodiment of this invention.

Reference is now made to FIG. 8 showing a third embodiment of this invention. This embodiment features the provision of an AFC (Automatic Frequency Control) circuit 22 connected to the tuner 2 and the video intermediate frequency amplifier circuit 5, the output signal of the AFC circuit 22 being connected to the erroneous operation prevention switch circuit 19 via an AFC switch 23. The AFC circuit 22 is adapted to automatically correct mistuning of the tuner 2. Accordingly, the television receiver provided with the AFC circuit 22 is free from mistuning. The AFC switch 23 serves as a switch for disconnecting the AFC circuit 22 from the tuner 2 when adjustment of the AFC circuit 22 is performed. With the AFC switch 23 connected to a terminal C, the AFC circuit 22 is adjusted and thereafter, the AFC switch 23 is thrown to a terminal D and mistuning is corrected automatically.

The adjustment of the AFC circuit 22 is usually performed by a person who will continue the adjustment until the observed pictures displayed on the picture tube 8 are high quality pictures. Therefore, after the amplitude distortion of the picture signal high frequency component has been completed automatically by means of the ATC circuit, there is no room for adjusting the AFC circuit 22.

In accordance with the third embodiment, when adjusting the AFC circuit 22, the ATC circuit is inhibited from operation. More particularly, the output signal of the AFC circuit 22 is fed to the erroneous operation prevention switch circuit 19 via the AFC switch 23 when the AFC switch 23 is connected with the terminal D, the switch 20 of the erroneous operation prevention switch circuit 19 is thrown to the terminal A to thereby permit the ATC circuit to operate. When the AFC switch 23 is connected with the terminal C to prevent application of the output of the AFC circuit 22 to the erroneous operation prevention switch circuit 19, the switch 20 of the erroneous operation prevention switch circuit 19 is thrown to the terminal B, thus inhibiting operation of the ATC circuit. Subsequently, when the AFC switch 23 is thrown to the terminal C, the AFC circuit 22 is ready for its adjustment.

In the third embodiment which is free from mistuning, the ATC circuit functions to correct the amplitude distortion mainly due to mismatching.

As described above, in accordance with this invention, the amplitude distortion of the television signal, especially the amplitude distortion of the picture signal high frequency component due to mismatching of the antenna with the tuner or mistuning of the tuner, can be corrected so that excessive overshooting or undershooting displayed on the picture tube screen of the television receiver can be prevented. This invention can also correct the amplitude distortion of the chrominance subcarrier to prevent beat disturbance due to interference of the aural carrier with the chrominance subcarrier and to alleviate cross color, thereby ensuring that the television receiver in accordance with this invention can reproduce high quality pictures.

We claim:

1. A control circuit of a television receiver for correcting the frequency response characteristic of the television signal comprising:
   (a) An SAW filter including an input electrode set connected to receive an intermediate frequency signal from a tuner, and first and second output electrode sets for delivering out the intermediate frequency signal received by the input electrode set, delivery of the intermediate frequency signal from said second output electrode set being delayed a predetermined time with respect to delivery of the intermediate frequency signal from said first output electrode set;
   (b) a variable gain circuit connected to receive the intermediate frequency signal from said second output electrode set of said SAW filter and varying the amplitude of the intermediate frequency signal to deliver out an amplitude varied intermediate frequency signal;
   (c) an adder circuit connected to receive the intermediate frequency signal from said first output electrode set of said SAW filter and the amplitude varied intermediate frequency signal from said variable gain circuit and adding together these intermediate frequency signals to deliver out a summed intermediate frequency signal;
   (d) detector means for amplifying and detecting the summed intermediate frequency signal from said adder circuit to deliver out a detected television signal;
   (e) amplitude sensor means connected to receive the output signal of said detector means and deriving out a color burst signal from the output signal of said detector means to generate a DC voltage whose level depends on the amplitude of the color burst signal; and
   (f) means for applying the DC voltage generated by said amplitude sensor means to said variable gain circuit to vary the amplitude of the intermediate frequency signal.

2. A control circuit of a television receiver for correcting the frequency response characteristic of the television signal comprising:
   (a) an SAW filter including an input electrode set connected to receive an intermediate frequency signal from a tuner, and first and second output electrode sets for delivering out the intermediate frequency signal received by the input electrode set, delivery of the intermediate frequency signal from said second output electrode set being delayed a predetermined time with respect to delivery of the intermediate frequency signal from said first output electrode set;
   (b) a variable gain circuit connected to receive the intermediate frequency signal from said second output electrode set of said SAW filter and varying the amplitude of the intermediate frequency signal to deliver out an amplitude varied intermediate frequency signal;
   (c) an adder circuit connected to receive the intermediate frequency signal from said first output electrode set of said SAW filter and the amplitude varied intermediate frequency signal from said variable gain circuit and adding together these intermediate frequency signals to deliver out a summed intermediate frequency signal;
   (d) detector means for amplifying and detecting the summed intermediate frequency signal from said adder circuit to deliver out a detected television signal;
   (e) a color bandpass filter for deriving out a chrominance subcarrier from the detected television signal of said detector means;
   (f) a chrominance signal amplifier circuit connected to receive the chrominance subcarrier from said color bandpass filter and amplifying the same;
   (g) a gate circuit connected to receive the chrominance subcarrier from said chrominance signal amplifier circuit and deriving out a color burst signal from the chrominance subcarrier;
   (h) an amplitude sensor circuit connected to receive the color burst signal from said gate circuit and generating a DC voltage whose level is proportional to the amplitude of the color burst signal; and
   (i) a DC voltage amplifier circuit connected to receive the DC voltage generated by said amplitude sensor circuit and amplifying the DC voltage to apply an amplified DC voltage to said variable gain circuit, said amplified DC voltage varying the gain of said variable gain circuit such that the amplitude of the color burst signal bears a predetermined value.

3. A control circuit of a television receiver for correcting the frequency response characteristic of the television signal comprising:

(a) an SAW filter including an input electrode set connected to receive an intermediate frequency signal from a tuner, and first and second output electrode sets for delivering out the intermediate frequency signal received by the input electrode set, delivery of the intermediate frequency signal from said second output electrode set being delayed a predetermined time with respect to delivery of the intermediate frequency signal from said first output electrode set;

(b) a variable gain circuit connected to receive the intermediate frequency signal from said second output electrode set of said SAW filter and varying the amplitude of the intermediate frequency signal to deliver out an amplitude varied intermediate frequency signal;

(c) an adder circuit connected to receive the intermediate frequency signal from said first output electrode set of said SAW filter and the amplitude varied intermediate frequency signal from said variable gain circuit and adding together these intermediate frequency signals to deliver out a summed intermediate frequency signal;

(d) detector means for amplifying and detecting the summed intermediate frequency signal from said adder circuit to deliver out a detected television signal;

(e) a color bandpass filter for deriving out a chrominance subcarrier from the detected television signal of said detector means;

(f) a chrominance signal amplifier circuit connected to receive the chrominance subcarrier from said color bandpass filter and amplifying or suppressing the same;

(g) a gate circuit connected to receive the chrominance subcarrier from said chrominance signal amplifier circuit and delivering out a color burst signal from the chrominance subcarrier;

(h) an amplitude sensor circuit, connected to receive the color burst signal from said gate circuit, for generating a DC voltage whose level is proportional to the amplitude of the color burst signal and applying this DC voltage to said variable gain circuit to vary the gain of said variable gain circuit such that the amplitude of the color burst signal bears a predetermined value; and (i) a voltage limiter circuit connected to receive the DC voltage of said amplitude sensor circuit and applying the received DC voltage to said chrominance signal amplifier circuit when this DC voltage is below a predetermined first voltage and is above a predetermined second voltage which is higher than the first voltage so as to vary the amplification degree of said chrominance signal amplifier circuit.

4. A control circuit of a television receiver according to claim 3 which further comprises:
(a) a switch circuit for on-off switching application of the DC voltage to a frequency response controlling circuit from said amplitude sensor circuit; and
(b) means connected to said gate circuit for detecting presence or absence of the color burst signal and generating an output signal correspondingly, said output signal being applied to said switch circuit to permit it to pass the DC voltage from said amplitude sensor circuit to said frequency response controlling circuit when the color burst signal is present and to inhibit the passage of the DC voltage when the color burst signal is absent.

5. A control circuit of a television receiver for correcting the frequency response characteristic of the television signal comprising:
(a) an SAW filter including an input electrode set connected to receive an intermediate frequency signal from a tuner, and first and second output electrode sets for delivering out the intermediate frequency signal received by the input electrode set, delivery of the intermediate frequency signal from said second output electrode set being delayed a predetermined time with respect to delivery of the intermediate frequency signal from said first output electrode set;

(b) a variable gain circuit connected to receive the intermediate frequency signal from said second output electrode set of said SAW filter and varying the amplitude of the intermediate frequency signal to deliver out an amplitude varied intermediate frequency signal;

(c) an adder circuit connected to receive the intermediate frequency signal from said first output electrode set of said SAW filter and the amplitude varied intermediate frequency signal from said variable gain circuit and adding together these intermediate frequency signals to deliver out a summed intermediate frequency signal;

(d) a video intermediate frequency amplifier circuit for amplifying the summed intermediate frequency signal;

(e) a video detector circuit connected to receive the amplified intermediate frequency signal and detecting the same;

(f) a color bandpass filter for deriving out a chrominance subcarrier from the detected signal of said video detector circuit;

(g) a chrominance signal amplifier circuit connected to receive the chrominance subcarrier from said color bandpass filter and amplifying the same;

(h) a gate circuit connected to receive the chrominance subcarrier from said chrominance signal amplifier circuit and deriving out a color burst signal from the chrominance subcarrier;

(i) an amplitude sensor circuit connected to receive the color burst signal from said gate circuit and generating a DC voltage whose level is proportional to the amplitude of the color burst signal;

(j) a DC voltage amplifier circuit connected to receive the DC voltage generated by said amplitude sensor circuit and amplifying the DC voltage to apply an amplified DC voltage to said variable gain circuit, said amplified DC voltage varying the gain of said variable gain circuit such that the amplitude of the color burst signal bears a predetermined value;

(k) an AFC circuit connected to receive the amplified intermediate frequency signal from said video intermediate frequency amplifier circuit and detecting whether or not the frequency of a video carrier contained in the received intermediate frequency signal coincides with a predetermined frequency, said AFC circuit generating, when said coincidence does not hold, a DC voltage which is applied to the tuner to make the frequency of the video carrier equal to the predetermined frequency;

(l) an AFC switch for on-off switching application of the DC voltage to the tuner from said AFC circuit; and (m) a switch circuit cooperative with said AFC switch to on-off switch application of the DC voltage to said variable gain circuit from said amplitude sensor circuit.

* * * * *